(12) United States Patent
Nishimura et al.

(10) Patent No.: US 11,458,694 B2
(45) Date of Patent: Oct. 4, 2022

(54) AUTOMATIC LAY-UP DEVICE

(71) Applicant: TSUDAKOMA KOGYO KABUSHIKI KAISHA, Ishikawa-ken (JP)

(72) Inventors: Isao Nishimura, Ishikawa-ken (JP); Hideaki Aburano, Ishikawa-ken (JP)

(73) Assignee: TSUDAKOMA KOGYO KABUSHIKI KAISHA, Ishikawa-Ken (JP)

( * ) Notice: Subject to any disclaimer, the term of this patent is extended or adjusted under 35 U.S.C. 154(b) by 0 days.

(21) Appl. No.: 17/079,848

(22) Filed: Oct. 26, 2020

(65) Prior Publication Data

US 2021/0138742 A1    May 13, 2021

(30) Foreign Application Priority Data

Nov. 7, 2019   (JP) .............................. JP2019-202027

(51) Int. Cl.
  *B29C 70/38*    (2006.01)
  *B29C 70/54*    (2006.01)
(52) U.S. Cl.
  CPC .............. *B29C 70/38* (2013.01); *B29C 70/54* (2013.01); *B29C 70/545* (2013.01)
(58) Field of Classification Search
  CPC ........ B29C 70/38; B29C 70/54; B29C 70/545
  See application file for complete search history.

(56) References Cited

U.S. PATENT DOCUMENTS

| | | | |
|---|---|---|---|
| 4,292,108 A | 9/1981 | Weiss et al. | |
| 4,574,029 A * | 3/1986 | Murray | ................. B29C 70/386 156/577 |
| 5,011,563 A | 4/1991 | Shinno et al. | |
| 5,738,749 A | 4/1998 | Grimshaw et al. | |
| 2015/0328876 A1 * | 11/2015 | Nishimura | .............. B32B 41/00 156/64 |
| 2018/0037018 A1 | 2/2018 | Nishimura et al. | |

FOREIGN PATENT DOCUMENTS

| | | | | |
|---|---|---|---|---|
| EP | 0144927 A2 | 6/1985 | | |
| EP | 2944453 A1 | 11/2015 | | |
| EP | 3090856 A1 * | 11/2016 | ........... | B29C 70/388 |
| EP | 3090856 A1 | 11/2016 | | |
| GB | 2101519 A * | 1/1983 | ........... | G05B 19/182 |
| JP | 2018-020409 A | 2/2018 | | |

OTHER PUBLICATIONS

Mar. 29, 2021, European Search Report issued for related EP Application No. 20204438.4.

* cited by examiner

*Primary Examiner* — Vishal I Patel
(74) *Attorney, Agent, or Firm* — Paratus Law Group, PLLC

(57) ABSTRACT

In an automatic lay-up device that lays up a long sheet-shaped thermosetting prepreg on a layer surface by moving, in a lay-up direction, a lay-up head including a raw-cloth roller around which the thermosetting prepreg is wound, a cutting device that cuts the thermosetting prepreg at a cutting angle, and a pressing device that presses the thermosetting prepreg against the layer surface, the automatic lay-up device includes a driving mechanism for moving the pressing device in a direction parallel to the width direction; and a drive controller that controls driving of the driving mechanism to start moving the pressing device when a cutting end of the thermosetting prepreg reaches a position of the pressing device.

1 Claim, 4 Drawing Sheets

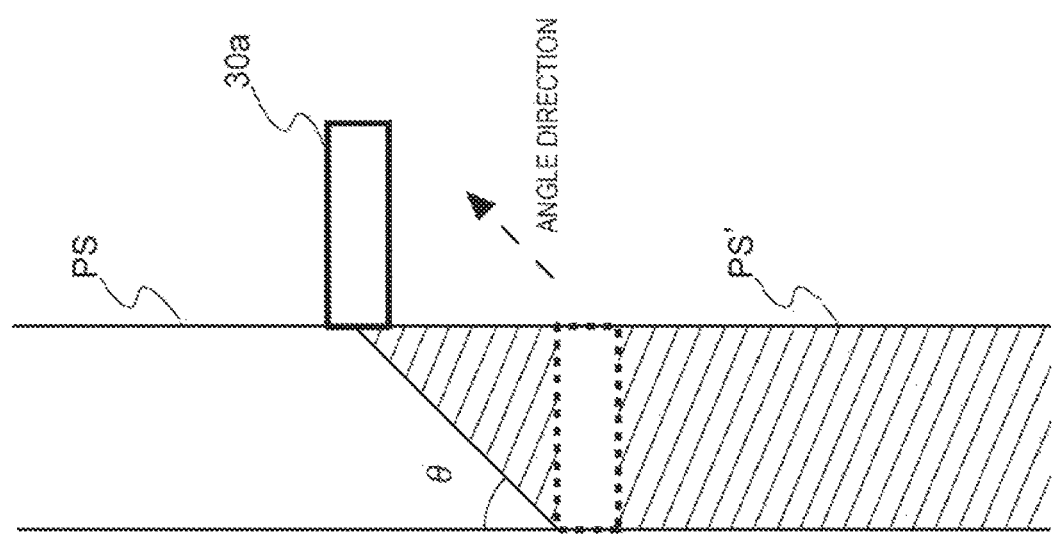
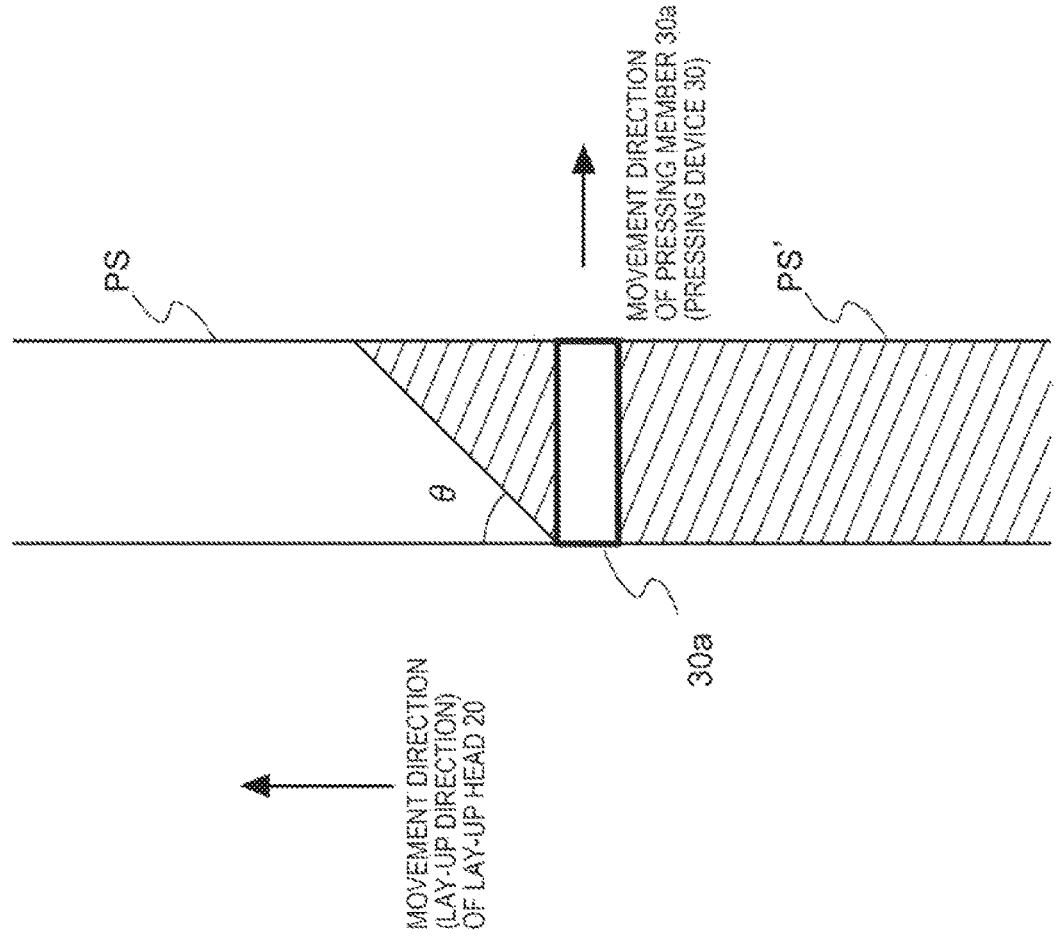

AUTOMATIC LAY-UP DEVICE

CROSS-REFERENCE TO RELATED APPLICATIONS

The present application claims priority from Japanese Patent Application No. 2019-202027, filed Nov. 7, 2019, the entire content of which is incorporated herein by reference.

BACKGROUND OF THE INVENTION

Field of the Invention

The present invention relates to an automatic lay-up device that lays up a long sheet-shaped thermosetting prepreg on a layer surface by moving, in a lay-up direction, a lay-up head including a raw-cloth roller around which the thermosetting prepreg is wound, a cutting device that cuts the thermosetting prepreg drawn from the raw-cloth roller at a cutting angle forming an angle with respect to a longitudinal direction and a width direction thereof, and a pressing device that presses the thermosetting prepreg against the layer surface.

Background Art

A fiber reinforced composite material such as carbon-fiber-reinforced plastic (CFRP) is produced from a prepreg lay-up body formed by laying up prepregs formed by impregnating reinforcing fibers (carbon fibers or the like) with a matrix resin. That is, the prepreg lay-up body has a multilayer structure in which a plurality of prepregs are laid up, and when manufacturing a fiber reinforced composite material, the prepregs are first laid up. As the prepreg, a woven material obtained by impregnating a woven fabric having reinforcing fibers as warps and wefts with a matrix resin, or a so-called UD material in which the reinforcing fibers are aligned in one direction, impregnated with a matrix resin, and converged. As the matrix resin, there are a thermosetting resin and a thermoplastic resin.

When laying up the prepregs, by laying up the prepregs in a state where the orientation directions of the reinforcing fibers in each layer of the prepreg lay-up body are different from each other, the fiber reinforced composite material produced thereby is superior in rigidity and strength as compared with those obtained by laying up the prepregs in a state where the orientation directions of the reinforcing fibers are aligned.

Then, such laying up the prepregs may be performed by an automatic lay-up device. The automatic lay-up device generally includes a lay-up head provided with a raw-cloth roller around which a long sheet-shaped prepreg (prepreg sheet) is wound, a cutting device that cuts the prepreg sheet for cutting out a prepreg piece to be laid up from the prepreg sheet drawn from the raw-cloth roller, and a pressing device that presses the prepreg sheet (prepreg piece) against a layer surface. Then, the automatic lay-up device moves the lay-up head in the lay-up direction on a table to pull out the prepreg sheet from the raw-cloth roller, and presses the prepreg sheet against the layer surface by the pressing device to lay up the prepreg piece. Further, the lay-up direction (moving direction of the lay-up head) is determined based on the orientation direction of the reinforcing fibers, and the lay-up is performed in any direction of a plurality of predetermined angles with respect to a reference direction (for example, a front and rear direction of the table) in a range in which the prepreg pieces defined on the table are laid up (hereinafter, referred to as "lay-up range").

Incidentally, in a general automatic lay-up device, the cutting device is configured to cut the prepreg sheet in a direction parallel to the width direction thereof. Therefore, in laying up the prepreg pieces by such an automatic lay-up device, the cutting end of the prepreg piece may be in a state of protruding from the lay-up range depending on the lay-up direction. On the other hand, the automatic lay-up device disclosed in JP-A-2018-020409 includes a cutting device configured to cut the prepreg sheet at a cutting angle that forms an angle with the longitudinal direction and the width direction thereof. Further, according to the automatic lay-up device disclosed in JP-A-2018-020409, the cutting end of the prepreg piece may not be in a state of protruding from the lay-up range as described above by setting the cutting angle as an angle corresponding to the lay-up direction.

SUMMARY OF THE INVENTION

In general, the above-described pressing device is provided in the automatic lay-up device so as to press the prepreg sheet (prepreg piece) at the same position in the longitudinal direction across the width direction, and sequentially press the prepreg sheet (prepreg piece) along with the movement of the lay-up head in the longitudinal direction. On the other hand, in a case where the prepreg sheet is cut at a cutting angle that forms an angle with respect to the longitudinal direction and the width direction as in the automatic lay-up device disclosed in JP-A-2018-020409 described above, the cutting end (rear end) the prepreg piece to be laid up is cut at the cut portion and the cutting end (front end) of the prepreg sheet that is continuous with the raw-cloth roller are overlapped at the same position of the prepreg sheet in the longitudinal direction.

Therefore, when trying to press the portion on the rear end side of the prepreg piece by the pressing device at the cut portion, the pressing by the pressing device is not only performed on the portion on the rear end side of the prepreg piece, but also on the portion on the front end side of the prepreg sheet. Then, in a case where the prepreg is a thermosetting prepreg, the thermosetting resin as the matrix resin has high viscosity, and thus if the portion on the front end side of the prepreg sheet is also pressed in such a manner, in the outside of the lay-up range, there is a case where the portion on the front end side is stuck to the table, which causes a problem in the subsequent lay-up.

Therefore, when laying up by using a thermosetting prepreg, in a case where the prepreg sheet is cut at a cutting angle according to the lay-up direction as described above, which is a case where the lay-up direction forms an angle with respect to the reference direction, the pressing of the prepreg piece by the pressing device may not be performed at the portion on the rear end side. Specifically, when the pressing device reaches the rear end of the prepreg piece being laid-up (pressed), by moving the pressing device upward, the cut portion including a portion on the front end side of the prepreg sheet may not be pressed by the pressing device.

Accordingly, the portion of the prepreg sheet on the front end side is prevented from being stuck to the table. However, in that case, since the portion on the rear end side of the prepreg piece to be laid up is not pressed by the pressing device, the portion on the rear end side is simply laid without being pressed against the layer surface. As a result, wrinkles may occur in the portion on the rear end side of the prepreg piece, or air (air bubbles) may remain between the portion on the rear end side and the layer surface, and in that case, the produced fiber reinforced composite material does not meet the desired quality.

Therefore, an object of the present invention to provide an automatic lay-up device capable of preventing poor quality of the fiber reinforced composite material to be produced by pressing the portion on the rear end side of the prepreg piece against the layer surface without pressing the portion on the front end side of the prepreg sheet.

The present invention is premised on an automatic lay-up device that lays up a long sheet-shaped thermosetting prepreg on a layer surface by moving, in a lay-up direction, a lay-up head including a raw-cloth roller around which the thermosetting prepreg is wound, a cutting device that cuts the thermosetting prepreg drawn from the raw-cloth roller at a cutting angle forming an angle with respect to a longitudinal direction and a width direction thereof, and a pressing device that presses the thermosetting prepreg against the layer surface.

Then, in order to achieve the above-described object, according to the present invention, the automatic lay-up device on which the invention is premised includes a driving mechanism provided in the lay-up head for moving the pressing device in a direction parallel to the width direction, and a drive controller that controls the driving of the driving mechanism to start moving the pressing device when a cutting end of the thermosetting prepreg reaches a position of the pressing device.

According to the automatic lay-up device of the present invention, a driving mechanism for moving the pressing device in a direction parallel to the width direction (hereinafter, simply referred to as "width direction") is provided, and when the driving mechanism moves the pressing device in the state where the lay-up head moves in the lay-up direction, the pressing device moves relative to the prepreg sheet (prepreg piece) in a direction that forms an angle (hereinafter, referred to as "angle direction") with the longitudinal direction and the width direction of the prepreg sheet (prepreg piece). The angle direction corresponds to movement speed of the pressing device with respect to movement speed of the lay-up head. Therefore, when the pressing device reaches the rear end of the prepreg piece being laid up (pressed), if the driving mechanism is controlled by the drive controller so that the pressing device is moved at a speed determined based on the cutting angle and the movement speed of the lay-up head, the pressing device moves in a direction that forms the same angle as the cutting angle with respect to the lay-up direction.

With this, in the cut portion, the portion on the front end side of the prepreg sheet is not pressed by the pressing device, and the portion on the rear end side of the prepreg piece is pressed against the layer surface by the pressing device. Therefore, while avoiding the occurrence of the problem caused by pressing the portion on the front end side of the prepreg sheet as described above, the occurrence of the problem caused when the portion on the rear end side of the prepreg piece is not pressed against the layer surface can be prevented, and as a result, poor quality of the fiber reinforced composite material to be produced can be prevented.

BRIEF DESCRIPTION OF THE DRAWINGS

FIGS. 4A and 4B are an explanatory diagram illustrating movement of a pressing device.

DETAILED DESCRIPTION OF THE INVENTION

Figure 1:
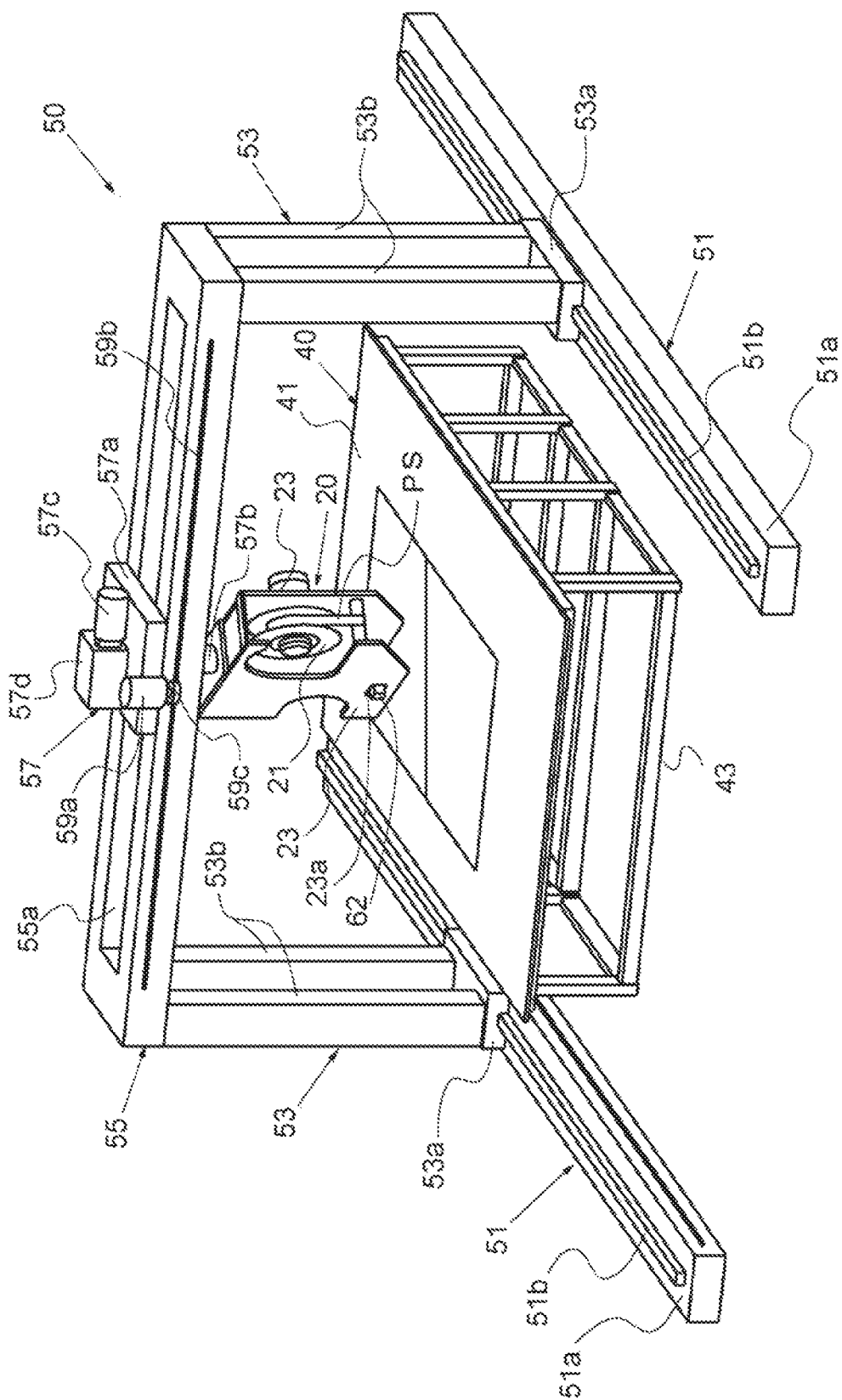
FIG. 1 is a perspective view illustrating an automatic lay-up device to which the present invention is applied.

As illustrated in FIG. 1, an automatic lay-up device to which the present invention is applied includes a lay-up head 20 on which a raw-cloth roller 21 around which a long-shaped thermosetting prepreg is wound is mounted, a table 40 on which the thermosetting prepreg drawn from the lay-up head 20 is laid up, and a support mechanism 50 that is a gate type support mechanism 50 for supporting (suspending) the lay-up head 20 in a suspended manner, and moving the lay-up head 20 on the table 40 in order to lay up the thermosetting prepreg on an upper surface of the table 40.

For each of these components, the table 40 is configured to include a top plate 41 having a rectangular shape in a plan view and a support base 43 that supports the top plate 41. The support mechanism 50 has agate type structure as described above, and includes a pair of side rails 51, 51, a pair of columns 53, 53 provided corresponding to the side rails 51, a gantry unit including a crossbeam 55 provided between both of the columns 53, 53, and a saddle unit 57 that supports the lay-up head 20 provided on the crossbeam 55 in the gantry unit.

Regarding the support mechanism 50, the pair of side rails 51, 51 in the gantry unit are portions that correspond to bases of the support mechanism 50 and mainly include a long prismatic base portion 51a. The pair of side rails 51, 51 have a longitudinal direction which is a direction parallel to a long side direction of the top plate 41 of the table 40, and is installed on a floor surface on both sides of the top plate 41 in a short side direction with respect to the table 40. In each of the side rails 51, a guide rail 51b for guiding the movement of the corresponding column 53 in the longitudinal direction is provided on the upper surface of the base portion 51a. Note that, as described above, the long side direction of the table 40 (top plate 41) and the longitudinal direction of the side rails 51 are the same direction, and these directions are aligned with the front and rear direction in the automatic lay-up device. Therefore, in the following description, those directions and the directions parallel thereto are referred to as "front and rear directions".

Each column 53 is configured to include a base portion 53a and a pair of columns 53b, 53b erected on the base portion 53a. Then, each column 53 is provided in a state of being placed on the base portion 51a of the corresponding side rail 51 in the base portion 53a, and is movable in the front and rear direction of the side rail 51 such that the base portion 53a is guided by the guide rail 51b of the side rail 51. The crossbeam 55 is a long prismatic beam member, and is installed between the pair of columns 53, 53 such that both ends thereof are attached to the upper ends of the columns 53b of the column 53. However, in such a state that the crossbeam 55 is installed, both columns 53, 53 are in a state where the positions of the side rails 51 in the front and rear direction are the same as each other, and thereby the crossbeam 55 is in a state where the longitudinal direction corresponds to the direction (the short side direction of the table 40 (top plate 41)) orthogonal to the front and rear direction of the side rail 51.

In the gantry unit having such a beam structure, a gantry driving mechanism (not shown) including, for example, a rack, a pinion gear, and a driving motor is provided between each side rail 51 and the corresponding column 53. That is, the gantry unit is configured to be driven so that the pair of columns 53, 53 and the crossbeam 55 installed between the columns 53, 53 are moved by the gantry driving mechanism along the front and rear direction of the side rail 51. Note that, as described above, the long side direction of the crossbeam 55 and the short side direction of the table 40 (top plate 41) are the same direction, and these directions are aligned with the left and right direction in the automatic lay-up device. Therefore, in the following description, those directions and the directions parallel thereto are referred to as "left and right directions".

The saddle unit 57 is a mechanism for keeping the lay-up head 20 in a state of being supported by the support mechanism 50, and is provided on the crossbeam 55 in the gantry unit configured as described above. The saddle unit 57 mainly includes a plate-shaped saddle base 57a provided on the crossbeam 55 to be movable in the left and right direction. Further, the saddle unit 57 includes a support shaft 57b rotatably supported by the saddle base 57a to project downward from the surface on the crossbeam 55 side of the saddle base 57a. Therefore, in order to allow the support shaft 57b to be disposed in the crossbeam 55 in the gantry unit and to move the saddle unit 57 in the left and right direction, a hole 55a that penetrates the crossbeam 55 in an up and down direction and extends in a left and right direction is formed. The support shaft 57b of the saddle unit 57 is inserted into the hole 55a and extends below the crossbeam 55.

The saddle unit 57 has a head driving mechanism provided on the saddle base 57a. The head driving mechanism is configured to rotate the support shaft 57b, and to include a driving motor 57c and a driving-force transmission mechanism 57d that connects the driving motor 57c and the support shaft 57b to transmit the rotation of the output shaft of the driving motor 57c to the support shaft 57b. Therefore, the saddle unit 57 has a configuration in which the support shaft 57b is rotated by the head driving mechanism around the own axis extending in the vertical direction as the rotation center.

Further, in the support mechanism 50, a saddle driving mechanism for moving the saddle unit 57 along the left and right direction is provided between the saddle unit 57 and the crossbeam 55. The illustrated example is one example thereof, and the saddle driving mechanism is configured to include a driving motor 59a that is attached to the axis of the output shaft toward the vertical direction with respect to the side surface of the saddle base 57a of the saddle unit 57, a rack 59b that is attached to a side surface of the crossbeam 55, a pinion gear 59c that is attached to the output shaft of the driving motor 59a and meshes with the rack 59b. Therefore, the support mechanism 50 is configured to be driven by the saddle driving mechanism so that the saddle unit 57 moves on the crossbeam 55 in the left and right direction.

The lay-up head 20 on which the raw-cloth roller 21 of the thermosetting prepreg is mounted is attached to the support shaft 57b of the saddle unit 57 in the support mechanism 50 configured as described above to be in a state of being suspended by the crossbeam 55 in the support mechanism 50. Then, in the support mechanism 50, when both columns 53, 53 are driven to move on the side rails 51, 51 in the front and rear direction, and/or the saddle unit 57 is driven to move on the crossbeam 55 in the left and right direction, the lay-up head 20 moves above the table 40 in the front and rear direction, the left and right direction, or a direction intersecting the front and rear direction and the left and right direction. Further, in the support mechanism 50, the support shaft 57b is driven to rotate, and thereby the lay-up head 20 is driven to rotate.

The lay-up head 20 is mainly constituted by a support frame including a pair of support plates 23, 23, and the raw-cloth roller 21 is supported between the support plates 23, 23. The raw-cloth roller 21 is formed by winding a long sheet-shaped thermosetting prepreg (hereinafter, referred to as "prepreg sheet PS") around a reel (winding frame). However, in the wound state, a release paper RP is attached to one surface of the prepreg sheet PS in order to prevent the prepreg sheets PS from sticking to each other due to the viscosity of the prepreg sheet PS between the winding layers. Then, in the automatic lay-up device, the thermosetting prepreg pulled out from the raw-cloth roller 21 of the lay-up head 20 is laid upon the table 40 (top plate 41). Therefore, the lay-up head 20 includes each mechanism for realizing such lay-up of the prepreg sheets PS inside the support frame (between the support plates 23, 23).

Figure 2:
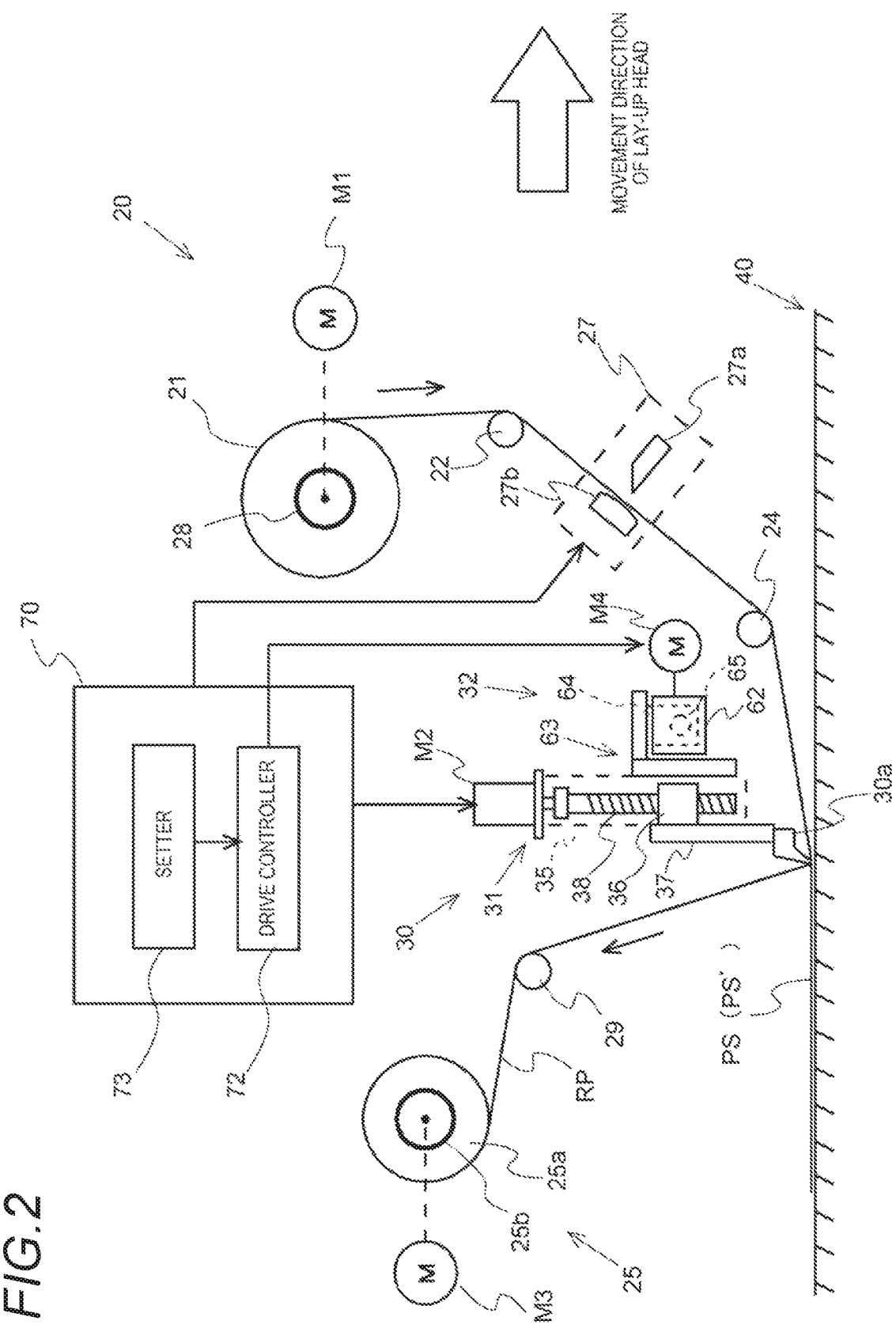
FIG. 2 is an explanatory diagram illustrating a lay-up head of an automatic lay-up device.

FIG. 2 is a diagram schematically illustrating a configuration inside the support frame in such a lay-up head 20. As illustrated in FIG. 2, in the lay-up head 20, the prepreg sheet PS pulled out from the raw-cloth roller 21 is wound around a guide roll 24 via a tension roller 22 and is fed out to the pressing device for performing the lay-up.

The raw-cloth roller 21 is rotatably supported by a let-off shaft 28 with respect to one support plate 23 of the pair of support plates 23, 23 of the support frame. The let-off shaft 28 is connected to a let-off driving motor M1 via a driving-force transmission mechanism such as a gear train. Then, as the let-off shaft 28 is rotationally driven by the let-off driving motor M1, the raw-cloth roller 21 is rotationally driven.

The prepreg sheet PS pulled out from the raw-cloth roller 21 is wound around the tension roller 22 so that the path is bent on the raw-cloth roller 21 side (upstream side) from the guide roll 24, and thereby the load by the prepreg sheet PS is applied to the tension roller 22. A load detector (not shown) such as a load cell is connected to the tension roller 22, and the load applied to the tension roller 22 by the tension of the prepreg sheet PS is detected by the load detector, and based on that, the tension of the prepreg sheet PS is detected. Then, based on the detected tension value of the prepreg sheet PS, as described above, the tension of the prepreg sheet PS is maintained at a desired level by controlling the driving of the let-off driving motor M1 that rotationally drives the raw-cloth roller 21.

The lay-up head 20 also includes a cutting device 27 that cuts a prepreg piece PS' from the prepreg sheets PS so that the prepreg sheets PS is laid up as a prepreg piece PS' having a predetermined length. The cutting device 27 is configured so that the cutting angle with respect to the longitudinal direction of the prepreg sheet PS can be changed.

More specifically, the cutting device 27 is provided between the tension roller 22 and the guide roll 24 in the path of the prepreg sheet PS. The cutting device 27 includes a cutter 27a, a receiving member 27b provided to face the cutter 27a with a path of the prepreg sheet PS interposed therebetween, and a cutter driving mechanism (not shown) that drives forward and backward with respect to the receiving member 27b (prepreg sheet PS) of the cutter 27a.

The automatic lay-up device includes a main control device 70 that controls the movement of the lay-up head 20. That is, the automatic lay-up device is configured such that the drive of each driving motor such as the driving motor 59a in the support mechanism 50 is controlled by the main control device 70. An operation program for lay-up is stored in the main control device 70, and the main control device 70 is configured to control each driving motor according to the operation program for each lay-up operation of laying up the prepreg sheet PS having a predetermined length.

Further, in the automatic lay-up device, the control of the cutter driving mechanism is also performed by the main control device 70. Specifically, the main control device 70 controls the driving of the cutter driving mechanism to advance the cutter 27*a* toward the receiving member 27*b* when the prepreg sheet PS having a predetermined length is pulled out from the raw-cloth roller 21. As a result, the cutter 27*a* is pressed against the prepreg sheet PS, and the prepreg sheet PS is cut. However, the advancement driving of the cutter 27*a* by the cutter driving mechanism is performed so that the release paper RP is not cut (only the prepreg sheet PS is cut).

The cutter driving mechanism is also configured to be capable of rotationally driving the cutter 27*a* in order to change the cutting angle by the cutter 27*a*. Then, in a case where the moving direction (lay-up direction) of the lay-up head 20 is changed to a direction different from the front and rear direction or the direction orthogonal to the lay-up direction, the main control device 70 controls the driving of the cutter driving mechanism so that the cutter 27*a* is rotated to have the cutting angle set as an angle corresponding to the lay-up direction.

The lay-up head 20 includes a pressing device 30 (details of the configuration will be described later) for pressing the prepreg sheet PS against the layer surface. The pressing device 30 includes a pressing member 30*a* that presses the prepreg sheet PS and a pressing driving mechanism 31 that moves the pressing member 30*a* in the vertical direction. The pressing driving mechanism 31 is configured to move between a position (hereinafter, referred to as "standby position") where the pressing member 30*a* is separated from the layer surface and a position (hereinafter, referred to as "lay-up position") where the prepreg sheet PS is pressed. The driving of the pressing driving mechanism 31 is also controlled by the main control device 70.

The lay-up head 20 also includes a take-up device 25 that takes up the release paper RP released from the laid up prepreg sheets PS. The take-up device 25 is configured to include a take-up reel 25*a* on which the release paper RP is taken up, a take-up shaft 25*b* attached to the support plate 23 in the support frame and rotatably supporting the take-up reel 25*a*, and a take-up motor M3 that is connected to the take-up shaft 25*b* via a driving-force transmission mechanism such as a gear train. The take-up device 25 is disposed behind the pressing member 30*a* in the lay-up direction and above the pressing member 30*a* in the vertical direction. The release paper RP is continuous without being cut by the cutting device 27 as described above, is taken up on the guide roll 29 disposed between the pressing member 30*a* and the take-up device 25, and then is guided to the take-up device 25.

In the automatic lay-up device as described above, when laying up the prepreg sheet PS on the layer surface, first, each driving motor is driven in the supporting mechanism 50 according to the operation program to move the lay-up head 20 to a lay-upstart position. After the lay-up head 20 is moved to the lay-up start position in such a manner, in a case where the lay-up direction in the subsequent lay-up is different from the lay-up direction in the previous lay-up, that is, in a case where the lay-up direction is changed, the lay-up head 20 is rotationally driven by the head driving mechanism, and the orientation of the lay-up head 20 (the orientation of the lay-up head 20 during the lay-up operation) is aligned with the changed lay-up direction.

Further, in the case where the lay-up direction is changed in such a manner, the cutter 27*a* is rotationally driven by the cutter driving mechanism in the cutting device 27, and the cutting angle is set to an angle corresponding to the changed lay-up direction. Specifically, the cutter 27*a* is rotationally driven so that the cutting angle is the same as the angle formed with respect to the longitudinal direction of the prepreg sheet PS on which the front edge is laid up in the lay-up direction in the lay-up range of the prepreg sheet PS defined on the table 40.

Next, the pressing driving mechanism 31 is driven to move the pressing member 30*a* of the pressing device 30 from the standby position to the lay-up position. As a result, the prepreg sheet PS is pressed against the layer surface by the pressing member 30*a*. Then, each driving motor in the support mechanism 50 is driven to move the lay-up head 20 in the lay-up direction. As a result, the prepreg sheet PS is pulled out from the raw-cloth roller 21 and pressed by the pressing member 30*a* against the layer surface, so that the prepreg sheet PS is laid up. Further, the release paper RP released from the prepreg sheet PS by laying up the prepreg sheets PS is taken up by the take-up reel 25*a* in the take-up device 25.

Then, when the prepreg sheet PS having a predetermined length is pulled out from the raw-cloth roller 21, the cutter driving mechanism is driven to perform the advancement driving of the cutter 27*a*. As a result, the prepreg sheet PS is cut, and the prepreg piece PS' is cutout from the prepreg sheet PS. Then, when the cutting end of the prepreg piece PS' reaches the layer surface along with the laying up (movement of the lay-up head 20), one lay-up operation is completed.

In the automatic lay-up device configured as described above, in the present invention, the automatic lay-up device includes a driving mechanism that is provided in the lay-up head 20 and moves the pressing device 30 in a direction parallel to the width direction of the thermosetting prepreg, and a drive controller that controls the driving of the driving mechanism. An embodiment (this embodiment) of such an automatic lay-up device will be described in detail below. However, in this embodiment, the driving mechanism in the present invention will be described as a width-direction driving mechanism 32.

Figure 3:
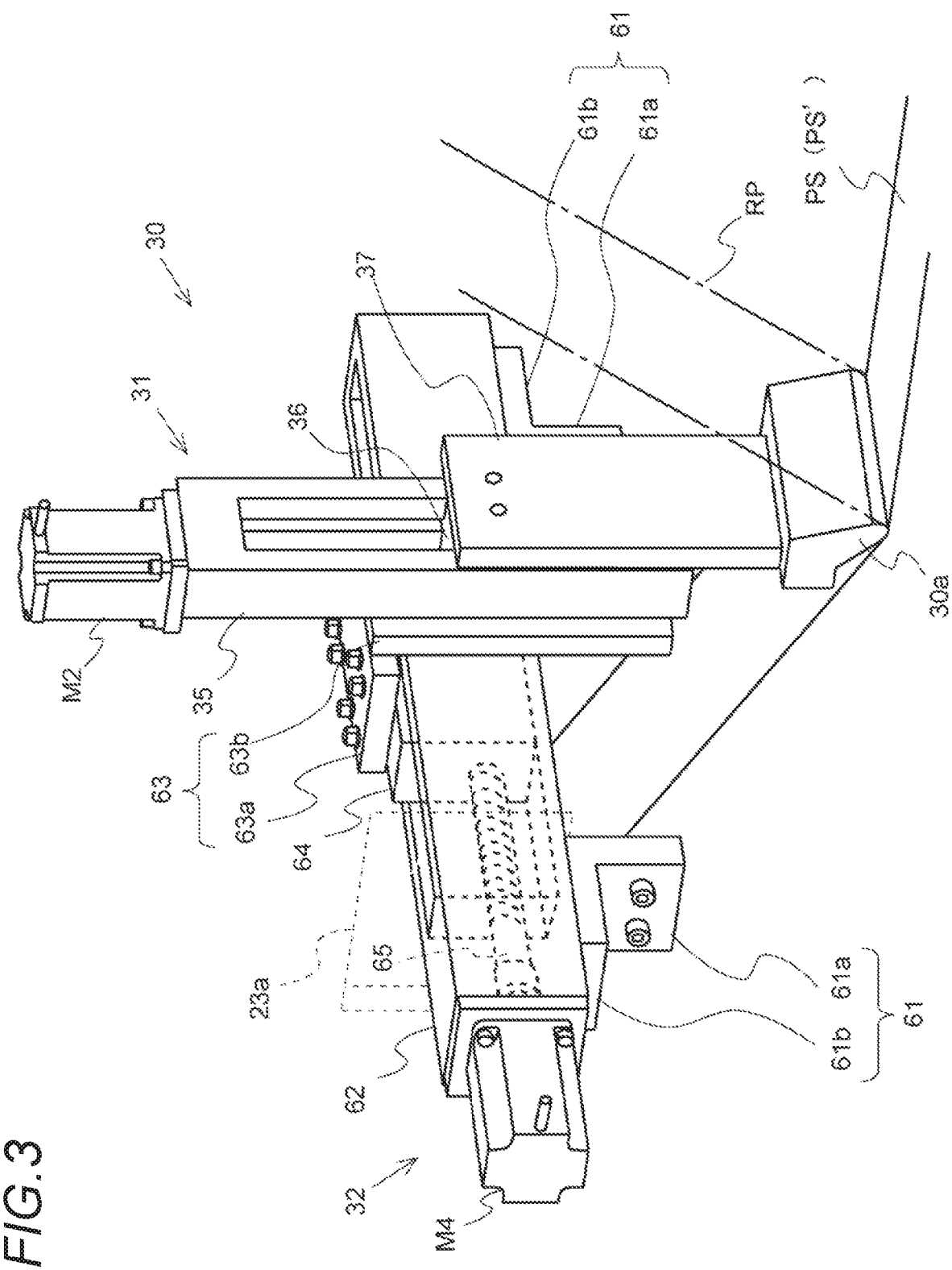
FIG. 3 is a perspective view illustrating an example of a driving mechanism according to the present invention.

In the pressing device 30, the pressing driving mechanism 31 is configured by a ball screw mechanism as illustrated in FIG. 2, and the ball screw mechanism is accommodated in a linear guide 35 that is a frame body. Then, the pressing device 30 is supported by the width-direction driving mechanism 32 at the linear guide 35 thereof, as illustrated in FIG. 3. The width-direction driving mechanism 32 is provided to the lay-up head 20 while being supported by the pair of support plates 23, 23 as described later. Therefore, the pressing device 30 is provided to the lay-up head 20 via the width-direction driving mechanism 32.

Regarding the width-direction driving mechanism 32, the width-direction driving mechanism 32 includes a ball screw mechanism as a structure for moving the pressing device 30 to be supported, and the ball screw mechanism is accommodated in a linear guide 62 that forms a frame body.

More specifically, the width-direction driving mechanism 32 is mainly constituted by the linear guide 62 as a frame body. The width-direction driving mechanism 32 includes a driving motor M4 as a drive source, and is attached to one end of the linear guide 62 in a state where the driving motor M4 directs the output shaft toward the linear guide 62 in a direction in which the output shaft is parallel to the longitudinal direction of the linear guide 62. Then, a screw shaft 65 is attached to the output shaft of the driving motor M4. With this, the width-direction driving mechanism 32 is configured such that the screw shaft 65, one end of which is supported by the driving motor M4 and the other end of which is supported by the linear guide 62, extends in the longitudinal direction within the linear guide 62.

The width-direction driving mechanism 32 also includes a nut bracket 64 that is slidably accommodated in the linear guide 62 in the longitudinal direction thereof. The screw shaft 65 is screwed into the nut bracket 64. Therefore, in the width-direction driving mechanism 32 having such a configuration, the screw shaft 65 is rotationally driven by the driving motor M4, so that the nut bracket 64 is displaced in the longitudinal direction within the linear guide 62.

The linear guide 62 has an open top surface, and an internal space for guiding the nut bracket 64 is formed as a groove-shaped guide groove. The nut bracket 64 has a height dimension slightly larger than the depth dimension of the guide groove in the linear guide 62. Therefore, the nut bracket 64 is accommodated in the linear guide 62, and the upper portion thereof slightly projects from the linear guide 62.

The width-direction driving mechanism 32 is supported by the pair of support plates 23, 23 in the lay-up head 20 as described above. More specifically, a holder base 61 for supporting the width-direction driving mechanism 32 is attached to each support plate 23. Each holder base 61 is an L-shaped bracket, and is attached to a side surface of each support plate 23 by a screw member at a portion (one end portion) 61*a* on one end side from a bent portion. The mounting state is such that the surface on the outer surface of a portion (the other end portion) 61*b* on the other end side of the holder base 61 faces vertically upward.

In this embodiment, the linear guide 62 in the width-direction driving mechanism 32 has a dimension larger than a distance between the pair of support plates 23, 23 in the longitudinal direction. On the other hand, each support plate 23 is formed with a rectangular hole 23*a* having a size through which the linear guide 62 can be inserted. The holder base 61 is attached to the side surface on the outer side of each support plate 23, and is disposed such that a position on the outer surface of the other end portion 61*b* in the vertical direction is slightly above the lower end position of the hole 23*a*. The width-direction driving mechanism 32 is supported by the pair of support plates 23, 23 such that the ends of the linear guides 62 that are inserted into the holes 23*a* and project from the support plates 23 are placed on the holder base 61. The linear guide 62 is fixed to each holder 61*b* by screwing a screw member inserted into a through hole formed in the other end portion 61*b* of each holder base 61 into the linear guide 62.

Then, the pressing device 30 is attached to the width-direction driving mechanism 32 supported in this manner, so that the pressing device 30 is supported in the lay-up head 20. The pressing device 30 is attached to the nut bracket 64 in the width-direction driving mechanism 32. Therefore, the nut bracket 64 is provided with a support structure 63 for attaching the pressing device 30. The support structure 63 is configured to include a first support member 63*a* attached to the nut bracket 64 and a second support member 63*b* attached to the first support member 63*a*.

The first support member 63*a* is a plate-shaped member, and is a member formed in a rectangular shape when viewed in the plate thickness direction. The first support member 63*a* is attached to the upper surface of the nut bracket 64 projecting from the linear guide 62 as described above, with one of the end surfaces in the plate thickness direction abutting. Here, the attachment is performed by aligning the long side direction of the end surface with the longitudinal direction of the linear guide 62. The first support member 63*a* has a dimension larger than that of the nut bracket 64 in the short side direction of the end surface (width direction of the linear guide 62). Then, the first support member 63*a* is attached, regarding the width direction of the linear guide 62, such that one of the side surfaces on both sides of the first support member 63*a* in the short side direction is positioned on the slightly outside of the linear guide 62 in the width direction.

The second support member 63*b* is also a plate-shaped member, and is a member formed in a rectangular shape when viewed in the plate thickness direction. The second support member 63*b* is attached such that one of both end surfaces in the plate thickness direction is in contact with the one side surface of the first support member 63*a*. However, regarding the attachment, with respect to the vertical direction, the long side direction of the end surface of the second support member 63*b* is substantially aligned with the vertical direction on the lay-up head 20, and the second support member 63*b* extends downward from the first support member 63*a*. Further, the attachment is performed such that with respect to the longitudinal direction of the linear guide 62, the center of the end surface of the first support member 63*a* in the long side direction and the center of the end surface of the second support member 63*b* in the short side direction are aligned. Then, the screw member inserted into the through hole formed in the second support member 63*b* is screwed into the first support member 63*a*, so that the second support member 63*b* is fixed to the first support member 63*a*.

The pressing device 30 is supported by the width-direction driving mechanism 32 on the lay-up head 20 via the support structure 63 by attaching the pressing driving mechanism 31 to the second support member 63*b* of the support structure 63. The pressing driving mechanism 31 is supported by the width-direction driving mechanism 32 in the linear guide 35 as described above (attached to the support structure 63).

More specifically, the linear guide 35 is attached to the second support member 63*b* of the support structure 63. However, the attachment is performed by bringing the other end surface of the second support member 63*b* into contact with the rear surface of the linear guide 35. The attachment is performed such that with respect to the vertical direction, the longitudinal direction of the linear guide 35 is substantially aligned with the long side direction of the end surface of the second support member 63*b*. The attachment is performed such that with respect to the width direction of the linear guide 35, the center in the width direction is aligned with the center in the short side direction of the end surface of the second support member 63*b*. A through hole is formed in the second support member 63*b*, and the screw member inserted in the through hole is screwed into the linear guide 35, so that the linear guide 35 is fixed to the second support member 63*b* (support structure 63).

The pressing driving mechanism 31 includes a driving motor M2 as a drive source. The driving motor M2 is attached to one end of the linear guide 35 in a state where the output shaft is oriented toward the linear guide 35 in a direction in which the output shaft is parallel to the longitudinal direction of the linear guide 35. Then, the pressing driving mechanism 31 is oriented such that the driving motor M2 is positioned above the linear guide 35 when attached to the support structure 63 (second supporting member 63*b*) as described above in the linear guide 35.

Similar to the linear guide 62, the linear guide 35 has a guide groove which is open to the front surface and extends in the longitudinal direction. As illustrated in FIG. 2, a screw shaft 38 is attached to the output shaft of the driving motor M2, and the screw shaft 38 extends in the longitudinal direction of the linear guide 35 in the guide groove. Further, nut bracket 36 is accommodated in the guide groove to be slidable in the longitudinal direction, and the screw shaft 38 is screwed into the nut bracket 36. Therefore, as the screw shaft 38 is rotationally driven by the driving motor M2, the nut bracket 36 is displaced in the linear guide 35 in the longitudinal direction (vertical direction). In the pressing driving mechanism 31 as well, the nut bracket 36 slightly projects from the linear guide 35. A plate-shaped support plate 37 for supporting the pressing member 30*a* is attached to the front surface of the nut bracket 36.

The pressing member 30*a* is attached to the nut bracket 36 via the support plate 37. That is, the pressing member 30*a* is supported by the nut bracket 36 (pressing driving mechanism 31) via the support plate 37. The pressing member 30*a* is supported such that with respect to the width direction, the center in the width direction is aligned with the center of the nut bracket 36 (linear guide 35) in the width direction. With respect to the vertical direction, the pressing member 30*a* is below the nut bracket 36 and is supported in a positional relationship with the nut bracket 36 to be positioned below the lower end of the linear guide 35 in a state where the nut bracket 36 is positioned at the lowest position in the guide groove of the linear guide 35. The state in which the nut bracket 36 is positioned at the lowest position is a state in which the pressing member 30*a* is positioned at the lay-up position.

Incidentally, the pressing member 30*a* of this embodiment is a block-shaped member having a substantially wedge-shaped cross section as illustrated in the drawing, and is attached to the support plate 37 with the front end portion facing downward. The pressing member 30*a* has, in the width direction, substantially the same dimension as that in the width direction of the prepreg sheet PS laid up on the above-described layer surface.

As described above, in the pressing device 30, the pressing member 30*a* is supported by the nut bracket 36 that is driven by the pressing driving mechanism 31 to move in the vertical direction. The linear guide 35 accommodating the nut bracket 36 is supported by the nut bracket 64 that is driven to move in the longitudinal direction of the linear guide 62 (width direction of the lay-up head 20) in the width-direction driving mechanism 32. Therefore, the pressing member 30*a* moves in the vertical direction by driving the nut bracket 36 in the pressing driving mechanism 31 to move in the vertical direction, and moves in the width direction by driving the nut bracket 64 in the width-direction driving mechanism 32 to move in the width direction of the lay-up head 20.

The automatic lay-up device in this embodiment includes a drive controller 72 that controls the driving of the width-direction driving mechanism 32 (driving motor M4). The drive controller 72 is included in the main control device 70 described above. The main control device 70 also includes a setter 73 that sets a setting value such as the movement speed in the lay-up direction for driving the lay-up head 20 as described above or a setting value of the cutting angle and the like when the cutting device 27 cuts the prepreg sheet PS.

In this embodiment, the control of the driving of the width-direction driving mechanism 32 is performed based on the set value of the lay-up speed and the set value of the cutting angle set in the setter 73 as described above. That is, in this embodiment, the set value itself of the movement speed of the pressing member 30*a* (pressing device 30) in the width direction by the width-direction driving mechanism 32 (hereinafter, also referred to as "width-direction movement speed") is not set, and the width-direction movement speed is obtained using the set value of the lay-up speed and the set value of the cutting angle. Therefore, the set value of the lay-up speed and the set value of the cutting angle are set values related to the width-direction movement speed, and the set values are set in the setter 73 of the main control device 70.

Regarding the width-direction movement speed, more specifically, when the pressing member 30*a* (pressing device 30) is moved in the width direction in the state where the lay-up head 20 moves in the lay-up direction, the pressing member 30*a* (pressing device 30) is moved relative to the prepreg sheet PS (prepreg piece PS') in a direction that forms an angle (hereinafter, referred to as "angle direction") with the longitudinal direction and the width direction of the prepreg sheet PS (prepreg piece PS'). Then, the angle direction corresponds to the width-direction movement speed with respect to the lay-up speed.

Then, in order to make the angle formed by the angle direction with the longitudinal direction of the prepreg sheet PS (prepreg piece PS') same as the cutting angle, the width-direction movement speed is obtained based on the set value of the lay-up speed and the set value of the cutting angle set for the actual lay-up. The width-direction movement speed is obtained by calculation using the set value of the cutting angle and the set value of the lay-up speed, and a calculation formula for that is stored in the drive controller 72 as a program (calculation program).

The main control device 70 is configured to grasp the time when the cutting end of the prepreg piece PS' reaches the position of the pressing member 30*a* (pressing device 30), and output, at that time, a signal for starting the movement (movement start signal) in the width direction of the pressing member 30*a* (pressing device 30) to the drive controller 72.

More specifically, in the setter 73 in the main control device 70, a path length (front end side path length) on the front end side of the prepreg sheet PS from the cutting position by the cutter 27*a* of the cutting device 27 to the pressing position by the pressing member 30*a* of the pressing device 30 is set in advance.

Although not shown, the automatic lay-up device includes a winding diameter sensor for detecting a winding diameter of the raw-cloth roller 21 and an encoder for detecting the amount of rotation of the let-off shaft 28, and the detection signals are input the main control device 70. The main control device 70 is configured to obtain the length (drawing length) of the prepreg sheet PS drawn from the raw-cloth roller 21 based on the detection signals, and monitor the drawing length.

The main control device 70 is configured to output a movement start signal to the drive controller 72 when the cutting of the prepreg sheet PS is performed by the cutting device 27 (when the cutter driving mechanism operates), that is, when a withdrawal length from the time of withdrawing the prepreg sheet PS for one lay-up operation from raw-cloth roller 21 is the same as a path length on the front end side.

The drive controller 72 is configured to control the driving of the driving motor M4 as described above, and is connected to the driving motor M4 on the output side thereof.

The drive controller 72 is configured to execute drive control of the driving motor M4 in response to the input of the above-described movement start signal.

More specifically, regarding the drive control, the drive controller 72 reads the set value of the lay-up speed and the set value of the cutting angle in response to the lay-up direction used for the lay-up operation in execution from the setter 73, with the input of the movement start signal as a trigger, and then obtain the width-direction movement speed by the above-mentioned calculation program by using the read set value.

In addition, the amount of movement of the nut bracket 64 per unit amount of rotation of the screw shaft 65 in the width-direction driving mechanism 32 is preset in the setter 73. Then, the drive controller 72 is configured to determine from the width dimension and the movement amount, the amount of rotation (amount of movement rotation) of the screw shaft 65 required to move the nut bracket 64 (pressing member 30*a*) by the width dimension as the width dimension of the prepreg sheet PS (prepreg piece PS') is set in the setter 73. The amount of movement rotation is information that determines a drive period of the width-direction driving mechanism 32 (driving motor M4) from the start to the end of the movement of the pressing member 30*a*. That is, in this embodiment, the drive period is determined by the amount of rotation of the driving motor M4 that rotates the screw shaft 65 by the amount of movement rotation.

The drive controller 72 is configured to start the driving of the driving motor M4 at the drive speed corresponding to the width-direction movement speed obtained as described above in response to the input of the movement start signal, and stop the driving when the amount of rotation of the driving motor M4 reaches the amount of movement rotation.

The operation of the automatic lay-up device in this embodiment as described above will be described with reference to FIGS. 4A and 4B. FIGS. 4A and 4B are a plan view of the prepreg piece PS'(prepreg sheet PS) to be laid up, and illustrates the pressing member 30*a* for pressing the prepreg piece PS' in addition to the prepreg piece PS'.

After the lay-up operation is started by driving the support mechanism 50 and the lay-up head 20, when the prepreg sheet PS for one lay-up operation is pulled out from the raw-cloth roller 21 as described above, the cutting operation is performed by the cutting device 27 for the prepreg sheet PS, and the prepreg piece PS' is cut out from the prepreg sheet PS that is continuous with the raw-cloth roller 21. Then, when the prepreg sheet PS corresponding to the path length on the front end side is further pulled out from the raw-cloth roller 21 from that time, as illustrated in FIG. 4A, the cutting end of the prepreg piece PS' reaches the position of the pressing member 30*a*. Then, when the cutting end of the prepreg piece PS' reaches the position of the pressing member 30*a* in this way, the main control device 70 outputs the movement start signal to the drive controller 72.

When the movement start signal is input, the drive controller 72 obtains the width-direction movement speed for moving the pressing member 30*a*, based on the set value of the lay-up speed set in the setter 73 and the set value of the cutting angle (cutting angle θ in FIGS. 4A and 4B) used in the lay-up operation being executed. The drive controller 72 starts driving the width-direction driving mechanism 32 (driving motor M4) at a drive speed in response to the obtained width-direction movement speed. With this, on the lay-up head 20, the pressing member 30*a* starts moving in the width direction at the width-direction movement speed.

Note that one lay-up operation is performed by moving the lay-up head 20 in the lay-up direction at least until the pressing member 30*a* reaches the end of the cutting end of the prepreg piece PS' in the lay-up direction. Therefore, between the time when the pressing member 30*a* at which the pressing member 30*a* starts to move in the width direction reaches the cutting end and the time when the pressing member 30*a* reaches the end of the cutting end, the lay-up head 20 continuously moves towards in the lay-up direction at the lay-up speed. As a result, as illustrated in FIG. 4B, by combining the movement of the pressing member 30*a* in the lay-up direction thereof with the movement of the lay-up head 20 and the movement in the width direction by the width-direction driving mechanism 32 at the width-direction movement speed as described above, the pressing member 30*a* moves relative to the prepreg piece PS' in a direction forming the same angle as the cutting angle θ with respect to the lay-up direction, that is, in a direction along the cutting end of the prepreg piece PS'.

Then, the drive controller 72 stops the driving of the driving motor M4 when the amount of rotation of the driving motor M4 reaches the amount of movement rotation. This ends the movement of the pressing member 30*a* in the width direction.

As described above, according to the present invention, in the lay-up operation performed while pressing the prepreg sheet PS (prepreg piece PS') by the pressing member 30*a*, the pressing of the prepreg piece PS' after the cutting end of the prepreg piece PS' reaches the position of the pressing member 30*a* is performed such that the pressing member 30*a* moves relative to the prepreg piece PS' along the cutting end thereof. As a result, the prepreg piece PS' is pressed by the pressing member 30*a* without pressing the portion on the front end side of the prepreg sheet PS that is present in the lay-up direction (longitudinal direction of prepreg sheet PS) and that overlaps with the prepreg piece PS' (continued with the raw-cloth roller 21). With this, while avoiding the occurrence of the problem caused by pressing the portion on the front end side of the prepreg sheet PS as described above, the occurrence of the problem caused when the portion at the cutting end of the prepreg piece PS' is not pressed against the layer surface can be prevented, and thereby poor quality of the fiber reinforced composite material to be produced can be prevented.

Incidentally, when the driving of the driving motor M4 is stopped as described above, the main control device 70 drives the driving motor M2 in the pressing driving mechanism 31 to move the pressing member 30*a* from the lay-up position to the standby position. Then, when the movement of the pressing member 30*a* toward the standby position is completed, the drive controller 72 starts driving the driving motor M4 to rotate the output shaft in a direction opposite to that when the pressing member 30*a* is moved in the width direction. As a result, the pressing member 30*a* moves in the direction opposite to the above-described movement. The drive controller 72 stops the driving of the driving motor M4 when the reverse rotation amount reaches the same amount of rotation as the amount of movement rotation. As a result, the pressing member 30*a* returns to the original position (the position at the time of starting the lay-up operation).

The present invention is not limited to the above-described embodiments (the above-described embodiments), and can be implemented in the following modified embodiments.

(1) In the above-described embodiment, the width-direction movement speed for moving the pressing member 30*a* (pressing device 30) in the width direction is obtained during the lay-up operation using the set value of the lay-up speed and the set value of the cutting angle. However, in the automatic lay-up device on which the present invention is premised, in a case where the lay-up speed is fixed to a specific speed, the width-direction movement speed is obtained using only the set value of the cutting angle. Further, in a case where the automatic lay-up device is configured to lay up the prepreg sheets PS only in a specific direction forming an angle with respect to the edge of the lay-up range (the cutting angle is fixed), the width-direction movement speed can be obtained in advance. Therefore, in that case, the width-direction movement speed can also be obtained in advance and set in the setter 73.

(2) In the above-described embodiment, the drive period of the width-direction driving mechanism 32 (driving motor M4) from the start of the movement to the end of the movement of the pressing member 30*a* (the pressing device 30) is defined by the amount of movement rotation which is the amount of rotation of the screw shaft 65. However, the drive period is not limited to such an amount of rotation of the screw shaft 65, and may be defined by a time (movement time) corresponding to the width-direction movement speed. The movement time is obtained based on the width-direction movement speed and the width dimension. In a case where the width-direction movement speed is obtained in advance as described above, this movement time can also be obtained and set in advance. The elapse of the movement time may be measured by, for example, providing the drive controller 72 with a timer circuit that starts an operation when the driving motor M4 starts driving, and using the timer circuit.

(3) Regarding the driving mechanism for moving the pressing device, in the above-described embodiment, the driving mechanism is constituted by a ball screw mechanism using the driving motor M4 as a drive source. However, in the automatic lay-up device according to the present invention, the driving mechanism is not limited to the one constituted by such a ball screw mechanism, and any other mechanism such as a rack opinion mechanism may be used as long as it can move the pressing device in a direction parallel to the width direction of the prepreg sheet PS.

(4) Regarding the mechanism that moves the member (pressing member 30*a*) that presses the thermosetting prepreg in the pressing device in the vertical direction, in the above-described embodiment, the pressing driving mechanism 31 as the mechanism is constituted by a ball screw mechanism using the driving motor M2 as the drive source. However, in the automatic lay-up device on which the present invention is premised, the mechanism is not limited to the ball screw mechanism, and may be another mechanism (for example, a rack opinion mechanism).

Regarding the pressing member, in the above-described embodiment, the pressing member 30*a* is a block-shaped member having a substantially wedge-shaped cross section. However, the shape of the pressing member is not limited to the one having such a substantially wedge-shaped cross section, and may be any shape as long as it can press the prepreg sheet PS in the width direction thereof. Further, the pressing member is not limited to a block-shaped member, but may be a roller-shaped member. In that case, the pressing member is rotatably supported in the pressing device in a direction in which the axis is parallel to the width direction of the prepreg sheet PS.

(5) Regarding the cutting device, in the above-described embodiment, the cutting device 27 is configured to cut the prepreg sheet PS by causing the cutter driving mechanism to drive the cutter 27*a* forward and backward. However, in the automatic lay-up device on which the present invention is premised, the cutting device is not limited to the one configured as such. For example, the cutting device may be a rotary-type cutting device that cuts an object by rotationally driving a cutter roll having a cutting edge (cutting blade) on the peripheral surface. In that configuration, the cutting angle can be changed by making the cutter roll rotatable in the longitudinal direction (axial direction).

The present invention is not limited to the examples described above, and can be modified as appropriate without departing from the spirit of the present invention.

What is claimed is:

1. An automatic lay-up device for laying up a long sheet-shaped thermosetting prepreg on a layer surface by moving a lay-up head, in a lay-up direction, in a state of the thermosetting prepreg being pressed against the layer surface by a pressing member, the lay-up head including a raw-cloth roller around which the thermosetting prepreg is wound, a cutting device that cuts the thermosetting prepreg drawn from the raw-cloth roller at a cutting angle forming an angle with respect to a longitudinal direction thereof and forming an acute angle with respect to a width direction thereof, a pressing device including the pressing member configured to press the thermosetting prepreg against the layer surface, and a pressing driving mechanism configured to move the pressing member in a vertical direction, the automatic lay-up device comprising:

a driving mechanism provided in the lay-up head for moving the pressing device in a direction parallel to the width direction; and a drive controller that controls driving of the driving mechanism to start moving the pressing device when a cutting end of the thermosetting prepreg reaches a position of the pressing member.

* * * * *